(12) United States Patent
Nogami et al.

(10) Patent No.: US 8,316,735 B2
(45) Date of Patent: Nov. 27, 2012

(54) INDUSTRIAL ROBOT AND CONTROL METHOD

(75) Inventors: Kazuyoshi Nogami, Kitakyushu (JP); Mitsuaki Nakanishi, Kitakyushu (JP); Keita Ogoh, Kitakyushu (JP); Tomohiro Matsuo, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 298 days.

(21) Appl. No.: 12/718,996

(22) Filed: Mar. 7, 2010

(65) Prior Publication Data

US 2010/0229670 A1   Sep. 16, 2010

(30) Foreign Application Priority Data

Mar. 16, 2009 (JP) ................................ 2009-062800

(51) Int. Cl.
*B25J 17/00* (2006.01)
*B25J 17/02* (2006.01)
*B25J 18/00* (2006.01)

(52) U.S. Cl. .................................. 74/490.03; 74/490.01
(58) Field of Classification Search ............... 74/490.01, 74/490.03, 490.05
See application file for complete search history.

(56) References Cited

U.S. PATENT DOCUMENTS

| 5,214,749 | A | * | 5/1993 | Brown ......................... 700/260 |
| 5,245,263 | A | * | 9/1993 | Tsai et al. ................. 318/568.1 |
| 6,755,092 | B2 | * | 6/2004 | Wakabayashi et al. .... 74/490.03 |
| 2003/0110878 | A1 | * | 6/2003 | Wakabayashi et al. .... 74/490.03 |
| 2005/0115352 | A1 | * | 6/2005 | Tanaka ........................ 74/490.03 |

FOREIGN PATENT DOCUMENTS

JP    2004-283940    10/2004

* cited by examiner

*Primary Examiner* — Justin Krause
(74) *Attorney, Agent, or Firm* — Ditthavong Mori & Steiner, P.C.

(57) ABSTRACT

An industrial robot includes a hollow chamber rotatably supported by a base, an arm rotatably supported by the hollow chamber, and drive devices provided in the hollow chamber and configured to drive the arm.

9 Claims, 5 Drawing Sheets

INDUSTRIAL ROBOT AND CONTROL METHOD

CROSS-REFERENCE TO RELATED APPLICATION

The present application is related to Japanese Patent Application No. 2009-062800 filed at Japan Patent Office titled "Industrial Robot and Control Method", all of which are incorporated herein by reference.

BACKGROUND OF THE INVENTION

1. Field of the Invention

The present invention relates to industrial robots and methods of controlling the same.

2. Discussion of the Background

There have been increasing applications of robots with motors to humanoid robots as well as to industrial robots. An exemplary mechanism is disclosed in Japanese Unexamined Patent Application Publication No. 2004-283940, showing a recent trend that a joint shaft is moved by a plurality of motors. Specifically, there is a proposal in which rotation at a single joint is realized with two motors.

In fields to which industrial robots are applied, there is a demand for improved throughput in the conveyance of goods so that productivity is improved. To meet such a demand, the speeds of operations of individual joint shafts included in industrial robots need to be increased, and the responsivenesses of motors therefore need to be improved. To increase the operating speeds, however, the outputs of the motors need to be increased, and the sizes of the motors are therefore increased. Consequently, the inertias of the motors are increased, leading to a problem that the responsivenesses of the motors cannot be improved.

There has been another trend that manufacturing facilities are designed with short manufacturing lines by reducing the footprints of industrial robots so that goods throughput is improved.

In this respect, since the known example employs a robot in which a single shaft is simply rotated by two motors, the two motors need to cooperate. This leads to a problem that the control operation becomes complicated.

Moreover, if a sudden instruction for stop such as emergency stop is issued, operations of the two motors are simultaneously stopped. Therefore, sudden reactive forces act on arms and speed reducers of the industrial robot. In such a case, deterioration of movable parts and relevant components due to aging may be accelerated. From the viewpoint of improving the goods throughput, it problematically takes a long time to perform maintenance work.

SUMMARY OF THE INVENTION

It is an object of the present invention to provide an industrial robot operated by a method that realizes high responsiveness with a reduced load.

According to one aspect of the present invention, an industrial robot includes a hollow chamber rotatably supported by a base, an arm rotatably supported by the hollow chamber, and a plurality of drive devices provided in the hollow chamber and configured to drive the arm.

According to another aspect of the present invention, the at least two drive devices are provided with respective controllers such that a single arm is driven by the at least two drive devices. Outputs of the drive devices are controlled to become equivalent to each other.

According to another aspect of the present invention, the at least two drive devices drive a single arm and include a first motor and a plurality of motors connected in series to the first motor. Power is directly supplied from a brake power source to the motors. A brake command is input from a servo device to the first motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
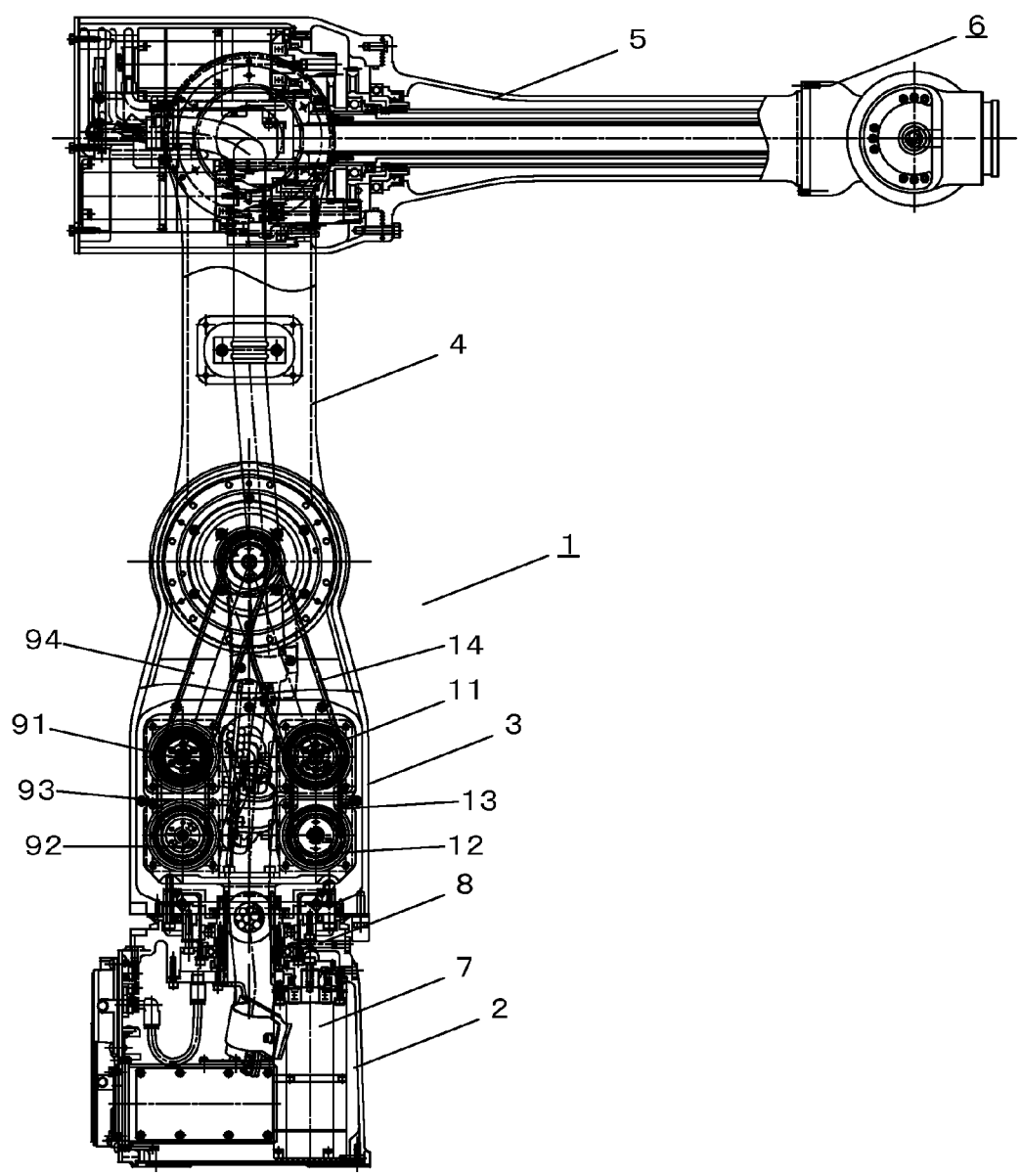
FIG. 1 is a side sectional elevation of an industrial robot.

Embodiments will now be described with reference to the accompanying drawings, wherein like reference numerals designate corresponding or identical elements throughout the various drawings.

Figure 2:
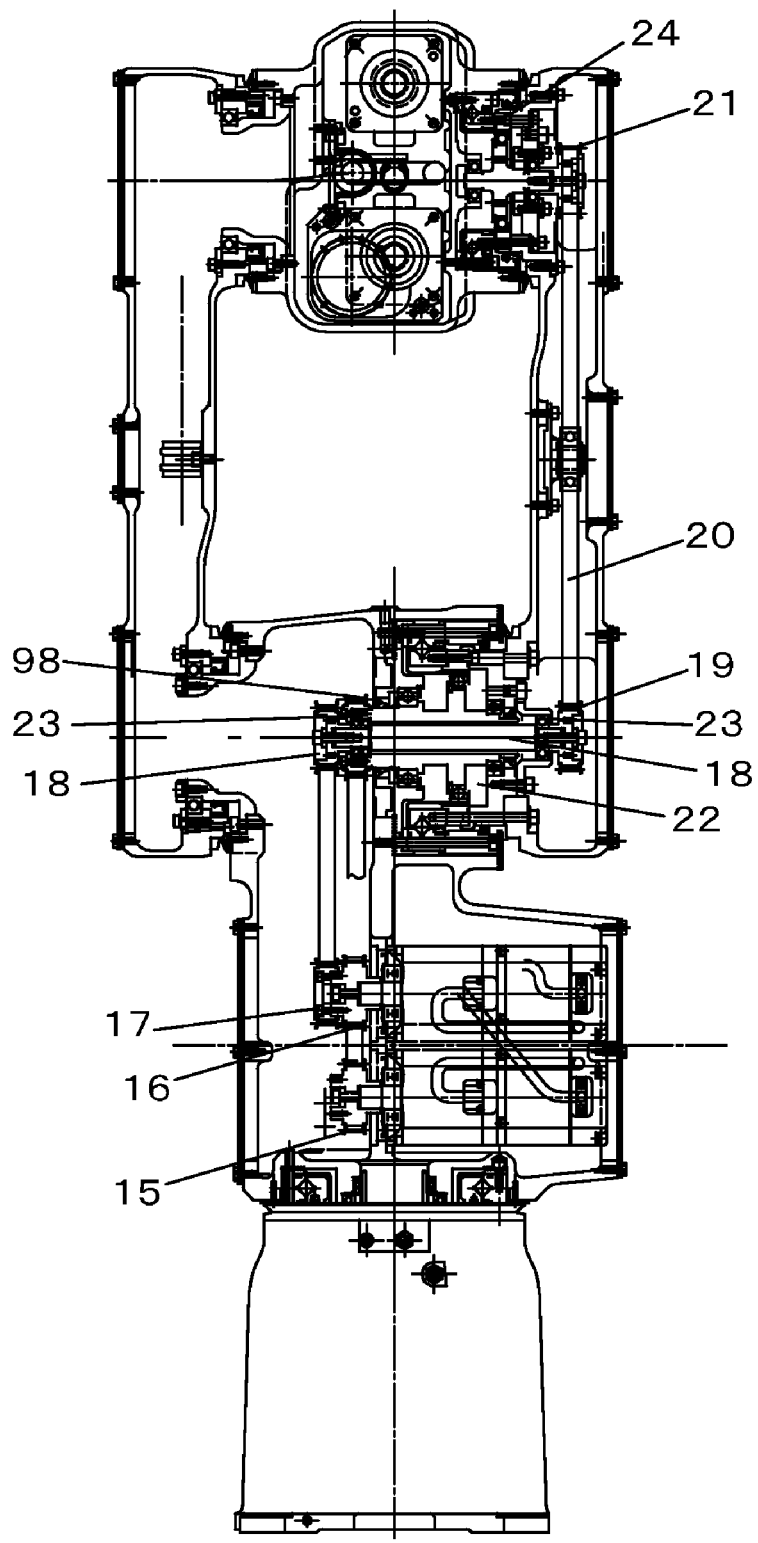
FIG. 2 is a front sectional elevation of the industrial robot.

FIG. 1 is a side sectional elevation of an industrial robot according to an embodiment of the present invention. FIG. 2 is a front sectional elevation of the industrial robot according to the embodiment of the present invention.

An industrial robot 1 is configured as follows. An inner chamber 3 is rotatably connected to a base 2. The inner chamber 3 is also rotatably connected to a first arm 4. The first arm 4 is rotatably connected to a second arm 5. The second arm 5 has at a tip thereof a wrist mechanism 6.

The base 2 is provided with a first motor 7. An output shaft of the first motor 7 is connected to a first speed reducer 8. An output shaft of the first speed reducer 8 rotates the inner chamber 3 about a vertical axis.

The inner chamber 3 houses second, third, fourth, and fifth motors 91, 92, 11, and 12. Referring to the side sectional elevation shown in FIG. 1, the second and third motors 91 and 92 are arranged side by side in the vertical direction in the inner chamber 3, and so are the fourth and fifth motors 11 and 12. The second and fourth motors 91 and 11 are arranged parallel to each other with a space interposed therebetween, and so are the third and fifth motors 92 and 12. A supply line reaching the wrist mechanism 6 runs through the foregoing spaces. Thus, the plurality of motors can be provided in a reduced space while a space for the supply line is provided.

The mechanism of power transmission will now be described. When the fourth motor 11 is rotated, the rotation of the fourth motor 11 is transmitted to a fourth pulley 98 through a fourth belt 14 stretched from a third pulley 17 provided on an output shaft of the fourth motor 11. In response to this, a shaft 18 rotatably supported by an input shaft of a second speed reducer 22 with a bearing 23 interposed therebetween is rotated. Then, a sixth pulley 21 is rotated through a fifth belt 20 stretched from a fifth pulley 19 provided on the shaft 18. Then, the speed of the rotation is reduced by a third speed reducer 24, and the rotation is transmitted through an output shaft of the third speed reducer 24 to the second arm 5, whereby the second arm 5 is rotated. Furthermore, the rotation of the fifth motor 12 is transmitted from an output shaft of the fifth motor 12 through a third belt 13 stretched from a first pulley 15 provided on the output shaft of the fifth motor 12, whereby a second pulley 16 provided on the output shaft of the fourth motor 11 is rotated. Thus, a torque acting on the third pulley 17 is the sum of torques produced by the fourth motor 11 and the fifth motor 12.

The mechanism of power transmission concerning the second and third motors 91 and 92 is similar to the mechanism described above. When the second motor 91 is rotated, the rotation of the second motor 91 is transmitted to a fourth pulley 98 through a second belt 94, whereby the input shaft of the second speed reducer 22 is rotated. Then, the rotation whose speed has been reduced is transmitted through an output shaft of the second speed reducer 22 to the first arm 4, whereby the first arm 4 is rotated. Furthermore, the rotation of the third motor 92 is transmitted to an output shaft of the second motor 91 through a first belt 93, whereby a pulley (not shown) provided on the output shaft of the second motor 91 is rotated. Thus, a torque acting on the fourth pulley 98 is the sum of torques produced by the second motor 91 and the third motor 92.

In the embodiment, the output of a motor is input to another motor, whereby a torque as the sum of torques produced by the two motors is obtained. Alternatively, two or more motors may be connected in series to a motor. In that case, for example, to obtain a torque capacity equivalent to the torque capacity produced in the embodiment, the torque capacity of each of the motors, three or more in total, to be connected to each other can be made smaller than that in the embodiment. Thus, with a plurality of motors, the imbalance between the torques produced by the motors is reduced, and complicated control operations become not necessary.

Figure 3:
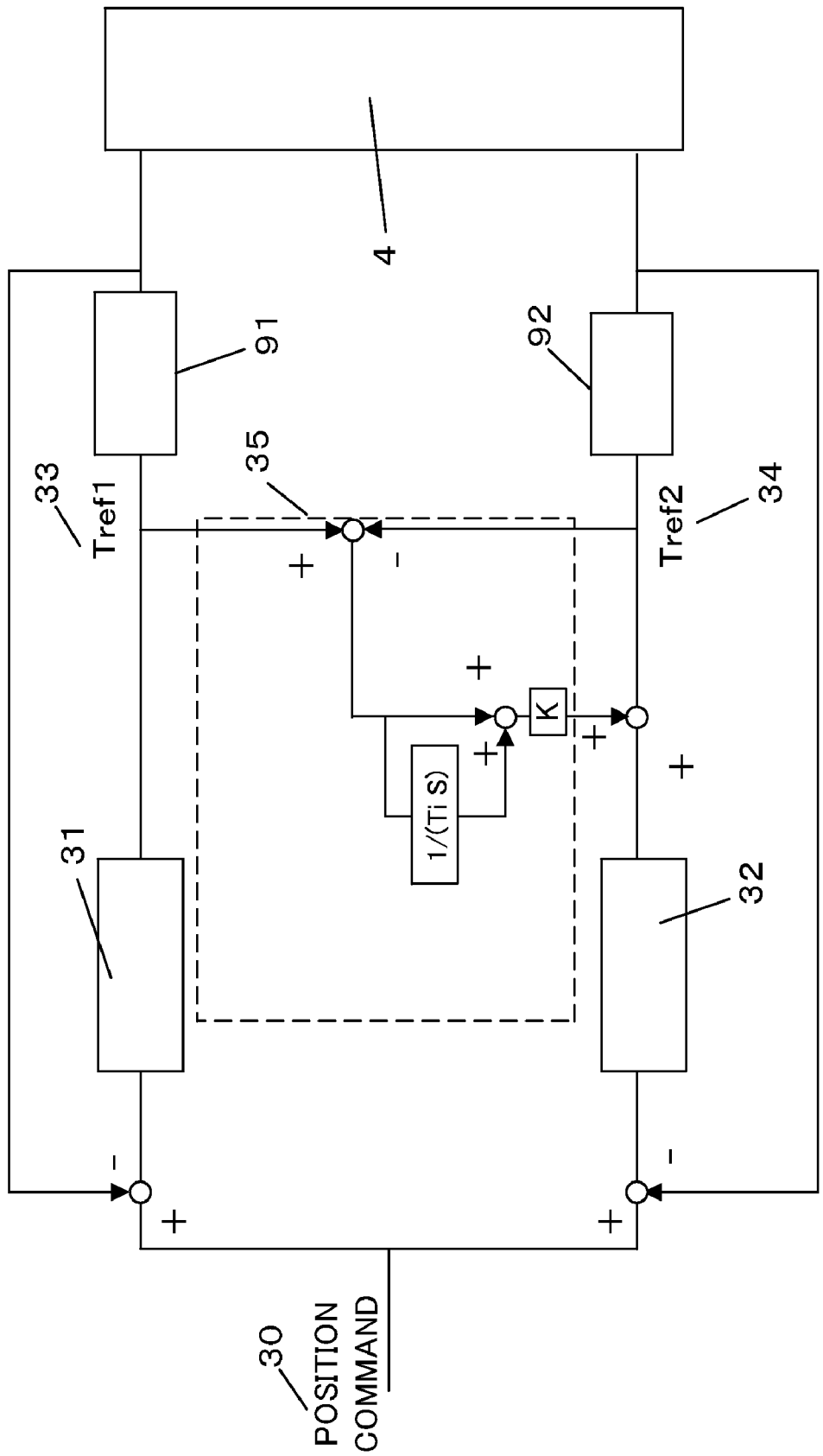
FIG. 3 is a control block diagram.

A control method will now be described with reference to FIG. 3. The following description concerns the second motor 91 and the third motor 92. To move the first arm 4, a position command 30 from a controller (not shown) is input to a first controller 31 and a second controller 32. The controllers 31 and 32 each include a position feedback circuit, a speed feedback circuit, and a torque feedback circuit. An electric current from a drive circuit (not shown) that has received a first torque command 33 from the first controller 31 is input to the second motor 91, whereby the first arm 4 is moved. Meanwhile, a second torque command 34 is issued from the second controller 32. A value from a third controller 35 calculated by adding a gain to the difference between the first torque command 33 and the second torque command 34 is added to the second torque command 34, and the resulting value is input to a drive circuit (not shown), whereby an electric current is applied to the third motor 92.

Thus, by adding to the second torque command 34 from the second controller 32 the value from the third controller 35 calculated by adding a gain to the difference between the first torque command 33 and the second torque command 34, the difference between the torque commands 33 and 34 for the second and third motors 91 and 92 is eliminated.

With the third controller 35, the torques produced by the second and third motors 91 and 92 become equivalent to each other. Therefore, cooperation of the two motors is effectively realized with no reduction in the torque produced by the second motor 91 due to the torque produced by the third motor 92. In a case where the torque capacity of each of the three or more motors to be connected to each other is made smaller than that in the embodiment so that a torque capacity equivalent to the torque capacity produced in the embodiment is obtained, the servo gain of the third controller 35 is changed, whereby the plurality of motors can be controlled easily.

A control method for stopping the industrial robot 1 will now be described, focusing on the first arm 4 and the second arm 5. If the industrial robot 1 is stopped when a servo device is off, the first arm 4 and the second arm 5 are lowered under their own weights. To prevent such a situation, the motors are equipped with brakes. A brake circuit will now be described with reference to FIG. 4. The following description concerns the behaviors of the brakes for the second to fifth motors 91, 92, 11, and 12. Power is supplied from a brake power source 41 to a brake relay circuit 42. Normally, the brakes for the third motor 92 and the fifth motor 12 are energized. In this state, the brakes are each in an off state. When a brake command 48 from a controller is input to the brake relay circuit 42, power from the brake power source 41 is supplied to the second motor 91 and the fourth motor 11 in accordance with the state of a contactor interlock 43, whereby operation commands for the second motor 91 and the fourth motor 11 are output.

Figure 5:
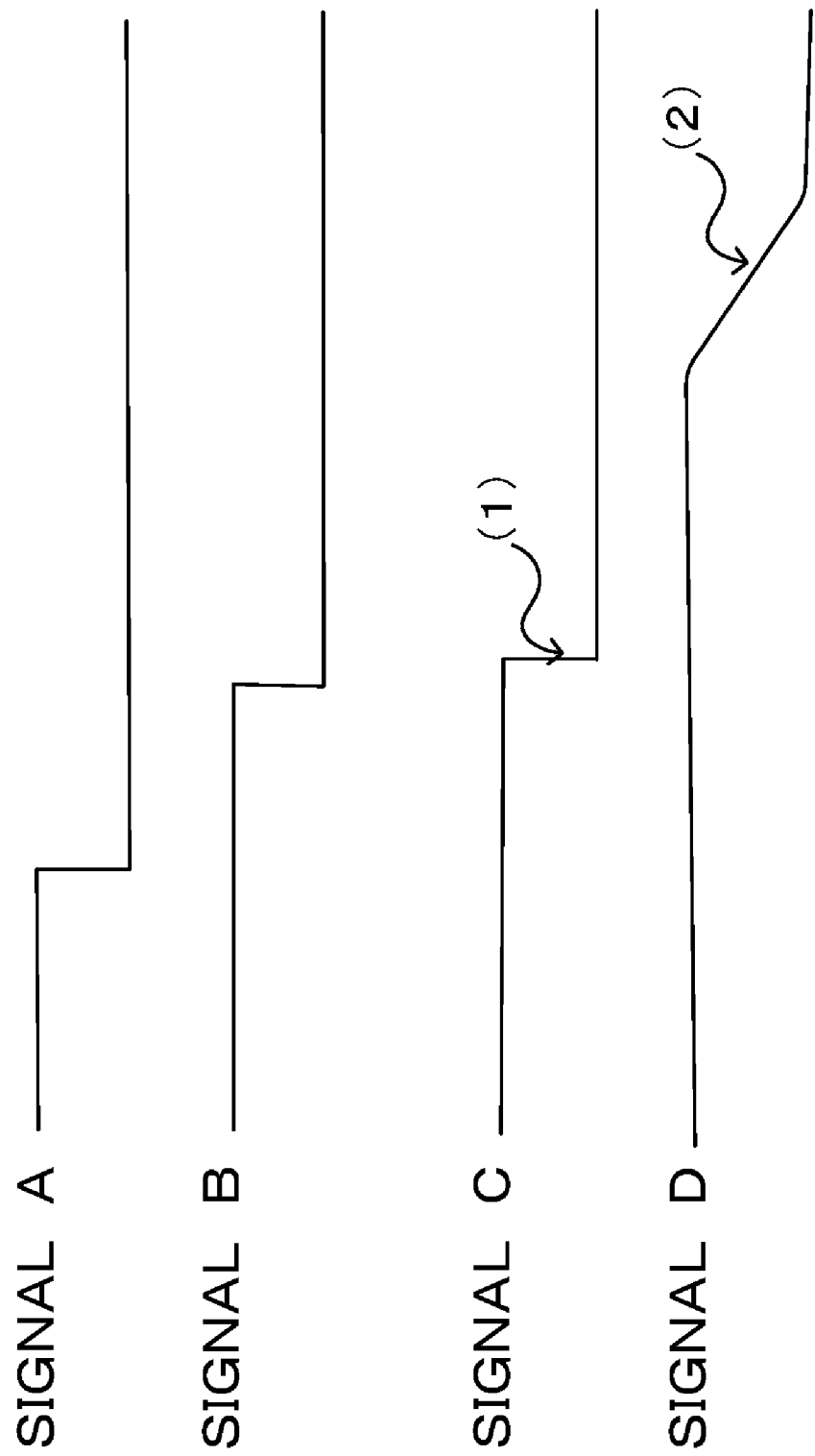
FIG. 5 is a timing chart.

FIG. 5 is a timing chart when the power is stopped. Changes in the power states of the brakes for the second to fifth motors 91, 92, 11, and 12 will now be described. In FIG. 5, Signal A shows a change from a state where the power is supplied to the controller to a state where the power is turned off, Signal B shows a change occurring when the power-off state is detected, Signal C shows a change in the power state of the brake for each of the second and fourth motors 91 and 11, and Signal D shows a change in the power state of the brake for each of the third and fifth motors 92 and 12. When the power is turned off, the power to the brakes for the second and fourth motors 91 and 11 is turned off with a delay, and the power to the brakes for the third and fifth motors 92 and 12 is subsequently turned off with a further delay. The power to the brakes for the second and fourth motors 91 and 11 is turned off abruptly as represented by change (1). Thus, the brakes operates such that the rotations of the motors 91 and 11 are locked. The power to the brakes for the third and fifth motors 92 and 12 is gradually reduced and is turned off with a specific period of time as represented by change (2). Thus, the brakes operates such that the torques for stopping the rotations of the third and fifth motors 92 and 12 gradually increase with a specific period of time.

The brakes for the motors employed in the embodiment of the present invention each produce a torque proportional to the electric current to be applied.

Figure 4:
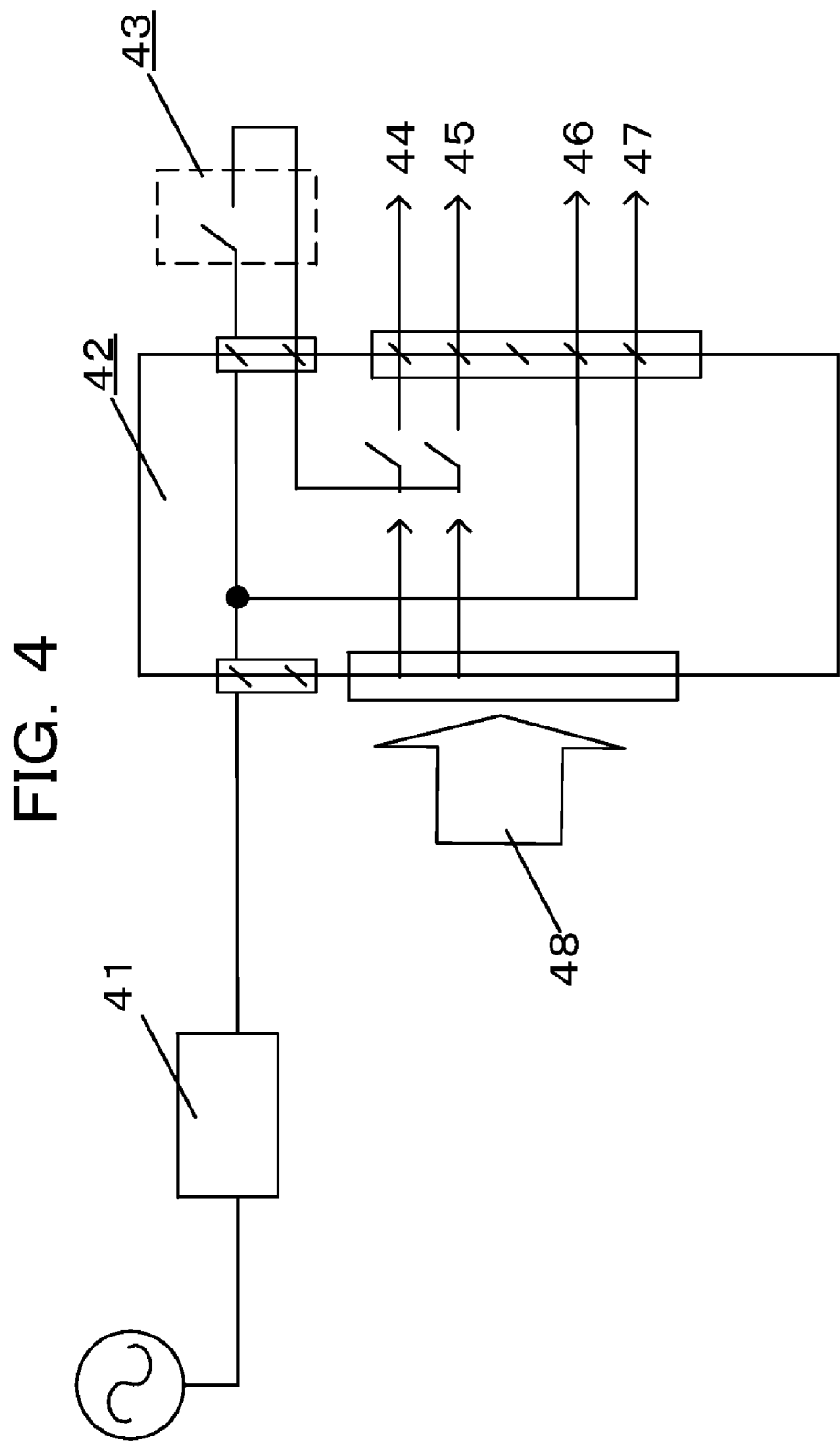
FIG. 4 is a diagram of a brake circuit.

Such state changes will now be described with reference to FIG. 4. Since the power of the servo device is turned off, the brake command 48 is turned off. In response to this, the contactor interlock 43 operates to cut off the power from the brake power source 41. When such an off state is detected, the operation commands for the second and fourth motors 91 and 11 each indicate the off state, whereby the corresponding brakes are activated. When the brake power source 41 is turned off, the power to the brakes for the third and fifth motors 92 and 12 is turned off, whereby the corresponding brakes are activated. In the above operation, the operation commands for the second and fourth motors 91 and 11 each indicate the off state with a delay from the stoppage of the power. Since the brake power source 41 has in an internal circuit thereof a backup circuit including a condenser or the like, the operation commands for the brakes for the third and fifth motors 92 and 12 each indicate the off state with a further delay. Thus, by producing brake torques for the third and fifth motors 92 and 12 with a delay from the operations of the second and fourth motors 91 and 11, the arms are prevented from being stopped abruptly. That is, the brakes start to be activated under a load about half the rated load, and the full rated load is applied to the brakes after a specific delay.

The delay, which is calculated by the backup circuit including the condenser provided in the brake power source 41, is about several tens of microseconds so that the arms may not be lowered.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An industrial robot comprising:
   a hollow enclosure rotatably supported by a base;
   an arm rotatably supported by the hollow enclosure;
   an additional arm rotatably supported by the arm; and
   a plurality of drive devices provided in the hollow enclosure,
   wherein the plurality of drive devices include a first motor and a second motor configured to drive the arm,
   wherein the plurality of drive devices further include a third motor and a fourth motor configured to drive the additional arm,
   wherein an output of the first motor is equal to an output of the second motor, and the arm being driven in accordance with a sum of torques produced by the first and second motors, and
   wherein the first and second motors have parallel rotational axes, wherein the third and fourth motors have parallel rotational axes, and wherein the rotational axes of the first and second motors are spaced apart from the rotational axes of the third and fourth motors in a direction perpendicular to axial directions of the first, second, third and fourth motors.

2. The industrial robot according to claim 1, wherein the output of the second motor is input to an output shaft of the first motor.

3. The industrial robot according to claim 1, wherein the first and second motors are arranged in series.

4. The industrial robot according to claim 1, wherein an output shaft of the first motor receives the output of the second motor connected in series to the first motor.

5. The industrial robot according to claim 1, wherein an output of the third motor is equal to an output of the fourth motor, and wherein the additional arm is driven in accordance with a sum of torques produced by the third and fourth motors.

6. The industrial robot according to claim 5, wherein the output of the fourth motor is input to an output shaft of the third motor.

7. The industrial robot according to claim 5, wherein the third and fourth motors are arranged in series.

8. The industrial robot according to claim 5, wherein the first and second motors are mounted in parallel and adjacent to the third and fourth motors within the hollow enclosure.

9. The industrial robot according to claim 5, wherein the first and second motors are configured to rotate the arm via a first belt and a first pulley on a shaft, wherein the third and fourth motors are configured to rotate a second shaft via a second belt and a second pulley, wherein the second shaft extends through the first shaft, and wherein the second shaft is connected to the additional arm via a third belt and a third pulley to rotate the additional arm.

\* \* \* \* \*